March 18, 1924.

R. H. GRIFFITH 1,487,379

AGRICULTURAL IMPLEMENT

Filed April 18, 1921

INVENTOR
RICHARD H. GRIFFITH,

By
Toulmin & Toulmin
ATTORNEYS

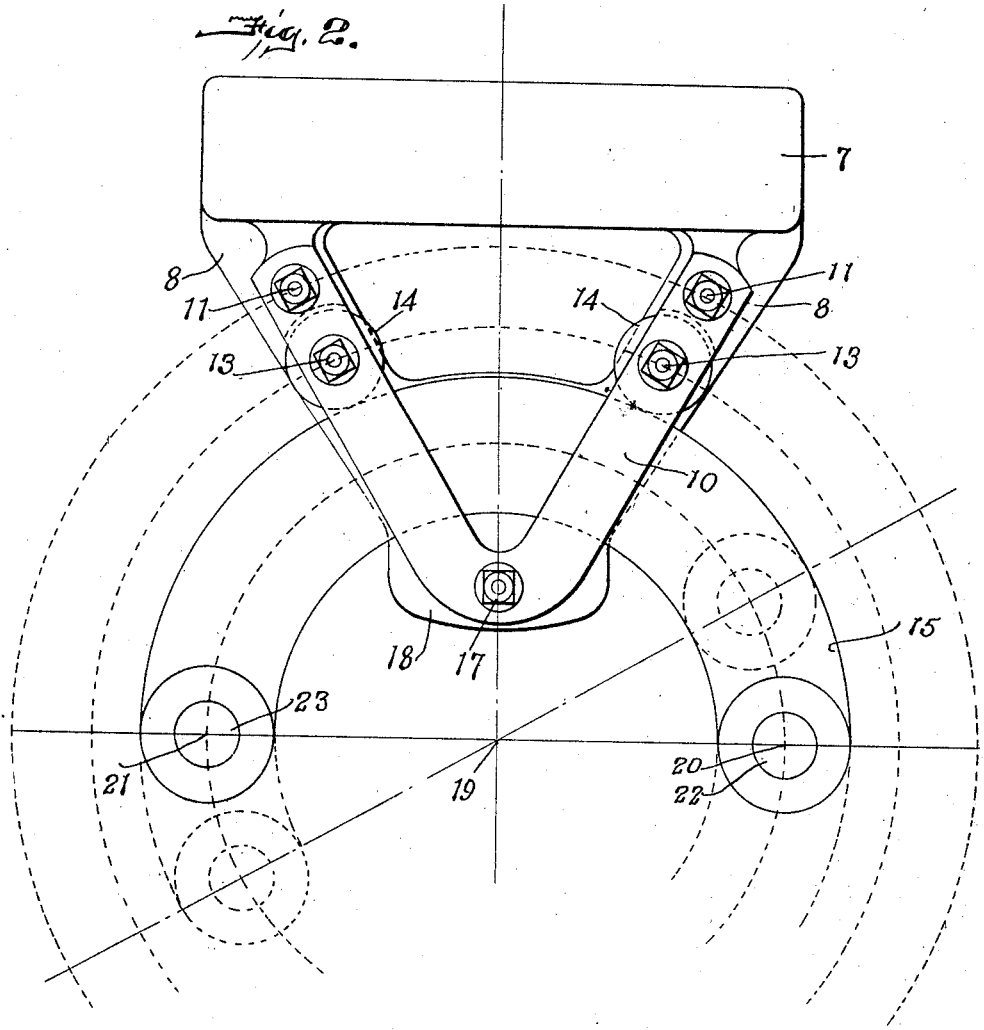

March 18, 1924.
R. H. GRIFFITH
AGRICULTURAL IMPLEMENT
Filed April 18, 1921
1,487,379
3 Sheets-Sheet 3
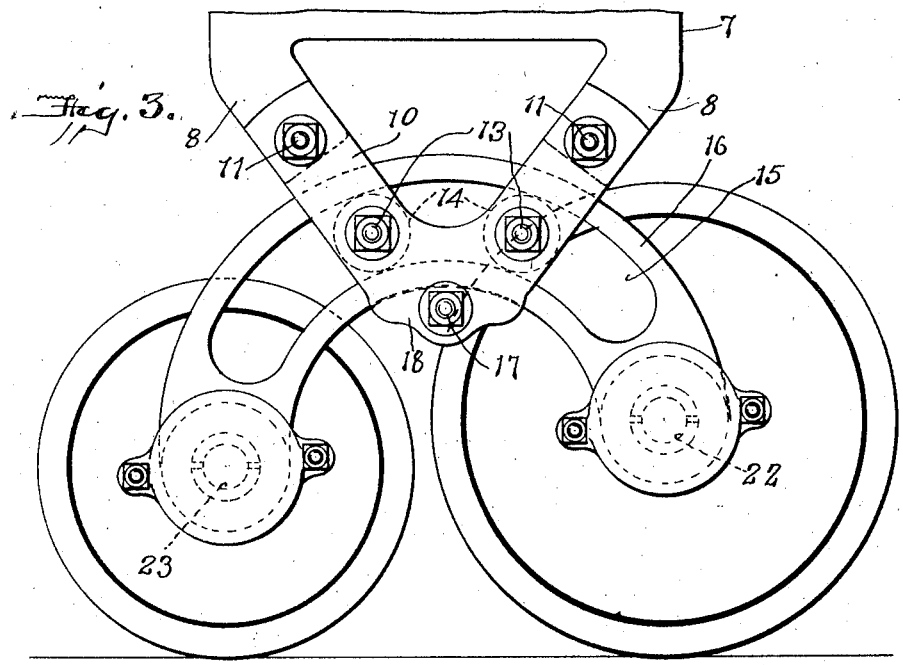
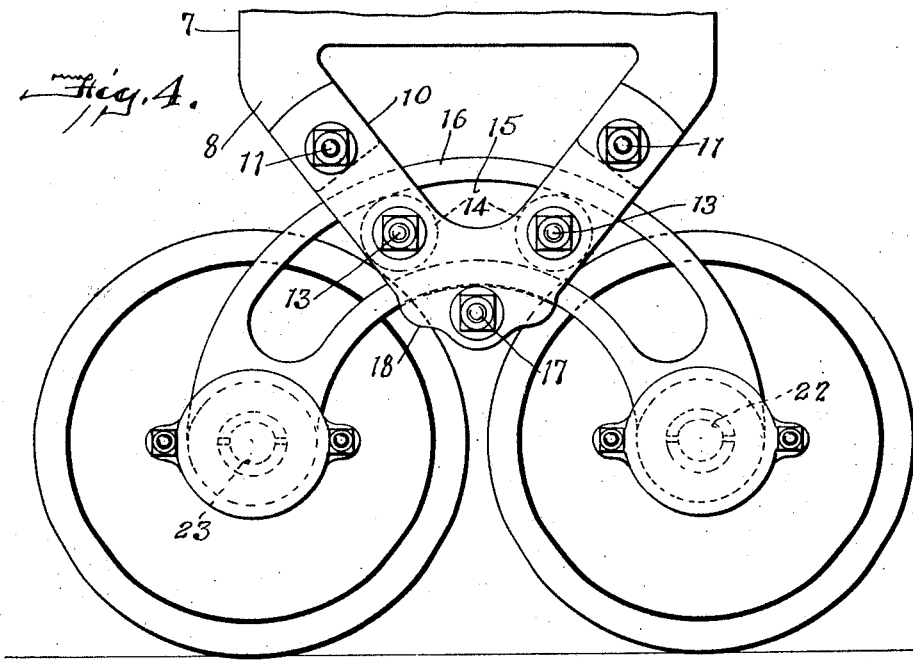
INVENTOR
RICHARD H. GRIFFITH,
By Toulmin & Toulmin
ATTORNEYS Patented Mar. 18, 1924.

1,487,379

UNITED STATES PATENT OFFICE.

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

AGRICULTURAL IMPLEMENT.

Application filed April 18, 1921. Serial No. 462,091.

*To all whom it may concern:*

Be it known that I, RICHARD H. GRIFFITH, a citizen of the United States, residing at Bellevue, in the county of Huron and State of Ohio, have invented certain new and useful Improvements in Agricultural Implements, of which the following is a specification, reference being had therein to the accompanying drawing.

My invention relates to agricultural implements and in particular to those implements used for crushing the surface or pulverizing the surface of the land.

It is my object to provide an implement for rolling, crushing or pulverizing the soil consisting of two gangs of pulverizing elements upon which the weight of a frame and possibly the driver of the vehicle will be equally distributed. It is my object to provide an implement which will follow the contours of the land and maintain its equal distribution of weight despite the fact that the pulverizing elements may be of different sizes.

It is my object to provide an implement that, irrespective of the size of the pulverizing elements or the contour of the ground, will maintain these elements in constant engagement with the ground and without communicating minor jolts and jars to the main frame, the weight carried thereon, and the operator. It is also my object to provide my implement with such an arrangement between the pulverizing elements and the main frame that there shall be the least drag upon the pole and the necks of the horses or upon the tractor pulling the implement due to the fact that in my implement the elements will ride over the surface of the ground, pulverizing the clods as the implement travels, and will not burrow the front series of implements into the ground thereby at some portions of the operation of the mechanism increasing the draft strains.

It is my object to provide a main frame carrying the weight and the draft strains and a supplementary frame that will have a full floating connection with the main frame and will move relatively independently of the main frame as the supplementary frame with the axles and pulverizing elements moves with relation to the contours of the ground. It is my object to provide a rolling and guiding engagement between the floating frame and the main frame.

It is my object to provide an implement in which the center of weight will remain constantly over a point midway between the centers of the two axles supported by the floating frames. It is my object to provide an implement in which the weight moves about a point half way between the centers of the axles of the floating frame as a center and also has the floating frame move about the same point as the center. It is my object to provide an implement in which the floating arch is of 180 degrees or more so that the point about which the main frame and the supplementary frame move will be midway between those centers and the distribution of weight will remain constant upon the two axles. It is also my object to provide an implement having a common center of this character about which the main frame, its subsidiary parts, the supplementary frame or floating frame, the axles and the pulverizing elements will turn.

The primary object of the invention is, therefore, the equal distribution of weight and the maintenance of that equal distribution in order that the land may be pulverized by both series of pulverizing elements equally, so that one series will not tend to burrow in the ground unduly as compared with the other series of elements, so that there will be the minimum of movement vertically imparted to the main frame, the weight, the operator, and the pole; and so that the draft strains will be uniformly applied at all times, thus saving the mechanism from sudden strains due to a part or one series of the pulverizing elements burrowing into the ground.

I, therefor, am able to provide an easy riding implement with an evenly distributed load at all times with pulverizing elements of the same size or varying sizes and with uniform draft strains.

Referring to the drawings:

Fig. 2, is a diagrammatic view of one end of the implement;

Fig. 3, is a side elevation of the implement showing packing elements of different sizes with the weight still remaining over a common center being the half way point between a line drawn from the centers of the axles;

Fig. 4, is an end elevation of the implement employing pulverizing elements of the same size showing the weight still remaining constantly over the median point on a line drawn between the centers of the two axles.

Figure 1:
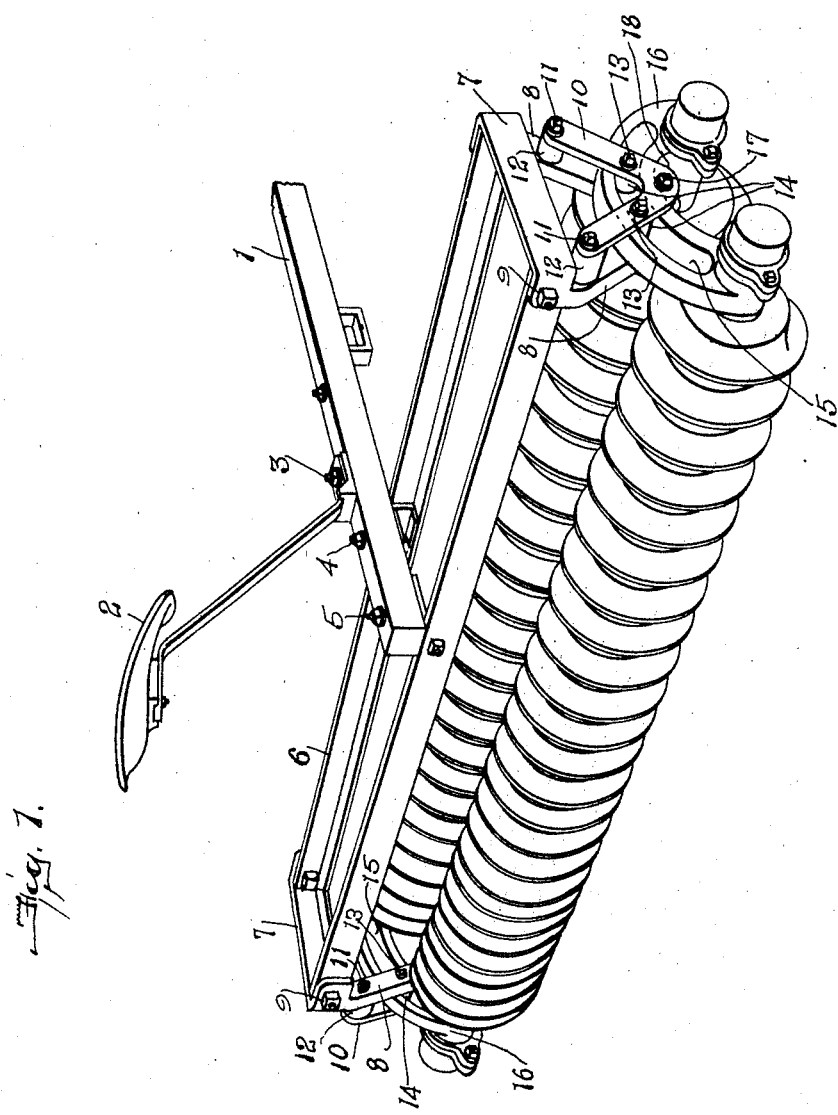
Fig. 1, is a perspective of the complete implement.

Referring in detail to the drawings, 1 is a pole to which the horses are attached, or to which the tractor is attached 2, is a seat mounted upon the pole and bolted thereto by the bolt 3. This pole is fastened by the bolts 4 and 5 to the main frame 6. This main frame has an end casting 7 that has downwardly projecting arms 8 that meet at their lower ends forming a triangular downwardly projecting end frame bolted to the main frame 6 by the bolts 9. Upon this end frame 8 is mounted a V-shaped removable frame member 10 bolted to the frame 8 by the bolts 11—11. Between the members 8 and 10 and supported by the bolts 11 are spacing blocks 12. Bolts 13 connect 8 and 10 to one another and have mounted upon them turning loosely thereon the rollers 14 that travel in the slot 15 of the floating frame 16 acting as a combined guiding and rolling engagement for allocating the floating frame 16 with respect to the downwardly projecting end frame 8 and its supplementary removable head 10. Beneath the floating frame 16 is a bolt 17 connecting the frame 8 and the end frame 10 to one another. Upon this bolt 17 is mounted a shoe 18 (see Figure 2) for guiding and additionally supporting in sliding engagement the supplementary or floating frame 16 with respect to the main frame 6.

This main frame extends 180 degrees in the arc of a circle. It is essential that it shall be a full 180 degrees so that the point 19 will be one-half the way between the center 20 and the center 21 of the axles 22 and 23 about which these axles turn. The point 19 is one-half the distance between the centers 20 and 21. The point 19 is also directly beneath the center of the weight of the main frame. This point 19 remains constantly beneath this center weight so that the weight is equally distributed upon the axles 22 and 23 irrespective of the positions of those axles either abnormally or normally. Under some conditions, as in Figure 3, the line between 20 and 21 may be at an angle to the line of draft but this does not modify the relationship between the weight and the axles which remains equally distributed irrespective of the movement of the floating frame 16.

In Figure 4, the line drawn between the centers of these axles is parallel with the line of draft, but the weight still remains equally distributed.

This is seen clearly from the diagram in Figure 2. It will be understood that the main frame will remain substantially in the position shown in Figure 2, as the pole is hitched to the horses or the tractor and maintains the frame in that position during the operation of the implement. The floating frame therefore changes its position freely with respect to the main frame. In Figure 2, the arrangement is shown of the rollers and the shoe being on the outside of the floating frame. In Figures 1, 3 and 4, the rollers are shown traveling in a cutaway portion or track within the floating frame. This makes no difference in the operation.

It will be observed from Figure 2, as well as from the other figures, that all of the parts turn about the point 19 as a center, that they all describe arcs about the center 19 and that the distance from 19 to any one of these arcs is the radius thereof.

So far as I am aware, I am the first one in an implement of this character to provide for an equal distribution of weight between the two series of elements irrespective of the size of those elements or the position thereof with respect to the main frame.

I have set forth heretofore many of the advantages and objects which are achieved by this type of construction.

Particularly, in motor-hauled implements of the present time it is important to have an even draft strain which greatly facilitates the operation of gasoline driven tractors. Uneven pulling puts upon the gasoline tractor many problems of operation which it is desired to eliminate if possible.

In those implements which either constantly or intermittently put a greater strain upon some portion of the implement and its motive power or put a greater strain at varying intervals upon the motive power attached to the implement, the disadvantage is always present of setting up undue draft strains and unequal distribution of weight.

By making my arch a complete semicircle, by locating and constantly maintaining the weight over a center half way between the extremities of this circle, and by moving all of the elements about that center as a center, I am enabled to achieve an entirely new result and secure an entirely new function from implements of this character with many novel advantages.

It will be apparent that this particular principle of operation will be applicable to other agricultural implements other than land rollers or pulverizers. I do not desire to confine myself to such an adaptation only but desire the full scope of my invention and it is my intention to so claim it in the accompanying claims.

Having thus fully described my invention, what I claim as new and desire to secure by Letters Patent, is:—

1. In a device of the character described, a main frame, a floating frame and means for maintaining the weight of the main frame equally distributed on both ends of the floating frame, said means including connections between the frames for allowing the floating frame to move relatively to the main frame while maintaining the center of weight of the main frame substantially in vertical lines above the points midway between the ends of the floating frame.

2. In a device of the character described, a main frame, a floating frame, movable relatively thereto, axles for supporting the ends of the floating frames, pulverizing elements on the axles, and connections between the main and floating frames for maintaining the center of weight of the main frame constantly in vertical lines midway between the centers of the axles, whereby the weight of the main frame will be equally distributed between said axles as they move up or down relatively to each other.

3. In a device of the character described, a main frame, a supporting floating frame, oscillatible relatively thereto, connections between said frames for maintaining the center of weight of the main frame in vertical lines half way between the ends of the floating frame in its oscillations relative to the main frame, whereby the center of weight of the main frame will remain constantly halfway between either end of the floating frame.

4. In a device of the character described, a main frame, a supporting frame oscillatible relatively thereto, and connections between said frames to compel said floating frame in its oscillations to turn about a straight center line removed from said main frame, said line passing through points halfway between the ends of the floating frame on straight lines drawn therebetween.

5. In combination, a main frame, supporting floating frames oscillatible relatively thereto and guided at either end thereof, said floating frames being in the form of semi-circular members, axles mounted one in each end of the semi-circular members, the axle centers being located 180° from one another measured on the semi-circular member, and a plurality of pulverizing elements mounted on each of said axles.

6. In a device of the character described, a main frame, supporting floating frames oscillatible relatively thereto and guided at either end of the main frame, said floating frames being in the form of semi-circular members, axles mounted one in each end of the semi-circular members, the axle centers being located 180° from one another measured on the semi-circular members, said axles being parallel to one another, and a plurality of pulverizing elements mounted on each of said axles, and means for maintaining the main frame substantially horizontal when the implement is in use.

7. In a device of the character described, a main frame, supporting floating frames oscillatible relatively thereto, axles parallel to one another and mounted in either end of said floating frames, a plurality of pulverizing elements, the elements on each axle being of the same size, said floating frames being in the form of semi-circular members and being oscillatible about points equidistant from the centers of said axles measured on straight lines drawn therebetween, said points being removed from said main frame, whereby the weight will be equally distributed upon said axles even during the oscillatible movements of the floating frames.

8. In a device of the character described, a main frame, supporting semi-circular floating frames oscillatible relatively thereto, axles parallel to one another in either end of said semi-circular floating frames, a plurality of pulverizing elements mounted on each of said axles, the elements on one axle being of larger size than those on the other axle and said frames in their oscillating movement turning about points equidistant between the centers of said axles on straight lines drawn therebetween, said points being removed from said main frame, whereby the weight of the frames will be equally distributed upon said axles.

9. In a device of the character described, a main frame, semi-circular floating frames at either end thereof having cutaway portions, axles at either end of the semi-circular frames for supporting the frames, rolling means carried by said main frame traveling in said cutaway portions of said floating frames, whereby the weight of the main frame is equally distributed upon the axles supporting the frames, and a plurality of pulverizing elements carried on each of said axles.

10. In a device of the character described, a main frame, semi-circular floating frames at either end thereof having cutaway portions, axles at either end of the semi-circular frames, rolling means carried by said main frame traveling in said cutaway portions of said floating frames, whereby the weight of the main frame is equally distributed upon the axles carried by the floating frames and a plurality of pulverizing elements carried on each of said axles, said elements of one series being larger in diameter than the elements of the other series.

11. In a device of the character described, a main frame having downwardly projecting end members, semi-circular floating end frames, rollers carried by the downwardly projecting members and maintaining a rolling engagement with the floating end frames, axles carried in either end of the floating frames, and a plurality of pulverizing elements on each of said axles, said main frame and floating frames being arranged relative to one another so that the weight of the main frame will remain constantly and equally distributed between the two axles.

12. In a device of the character described, a main frame having downwardly projecting end members, semi-circular floating end frames, rollers carried by the downwardly projecting members and maintaining a rolling engagement with the floating end frames, axles carried in either end of the floating frames, a plurality of pulverizing elements on each of said axles, said main frame and floating frames being arranged relative to one another so that the weight of the main frame will remain constantly and equally distributed between the two axles, and means of detaching a portion of said main frame for the removal of said rollers.

13. In a device of the character described, a main frame having downwardly projecting end members, semi-circular floating end frames, rollers carried by the downwardly projecting members and maintaining a rolling engagement with the floating end frames, axles carried in either end of the floating frames, a plurality of pulverized elements on each of said axles, said main frame and floating frames being arranged relative to one another so that the weight of the main frame will remain constantly and equally distributed between the two axles, means for supporting slidably said floating frames with respect to said main frame, and means for removing a portion of said main frame for removing said slidable member and roller members on the main frame for adjustment and renewal.

14. In combination, a main frame, downwardly projecting ends thereof, rollers on either end of said downwardly projecting ends, end plates retained parallel to said downwardly projecting ends and spaced therefrom by said rollers, floating arches at either end of said downwardly projecting ends traveling between said downwardly projecting ends and said end plates being guided by said rollers in the reciprocation of said floating frames with respect to said main frame, said floating frames extending through an arc of 180° between the centers of axles carried on either end thereof, axles carried thereby parallel to one another and a plurality of pulverizing elements carried on each of said axles.

15. In combination, a main frame, downwardly projecting ends thereof, rollers on either end of said downwardly projecting ends, end plates retained parallel to said downwardly projecting ends and spaced therefrom by said rollers, floating, semi-circular arches at either end of said downwardly projecting ends traveling between said downwardly projecting ends and said end plates being guided by said rollers in the reciprocation of said floating frames with respect to said main frame, said floating frames extending through an arc of 180° between the centers of axles carried on either end thereof measured on said arches, axles carried thereby parallel to one another and a plurality of pulverizing elements carried on each of said axles, said elements being of unequal size.

16. In combination, a main frame, downwardly projecting end members, detachable end plates fastened thereto at either end thereof and spaced therefrom, floating arches respectively traveling between said end plates and downwardly projecting end members, cutaway portions in said floating frames, rollers embraced between said downwardly projecting end members and end plates traveling in said cutaway portions in the floating frames, said floating frames extending through an arc of 180° between the centers of axles carried in either end of said floating frames measured on said arches, axles carried by said floating frames in either end thereof, said axles being parallel to one another, a plurality of pulverizing elements carried on each of said axles, whereby the weight of the main frame is equally distributed between said axles at all times, and a guiding shoe making a sliding engagement with the exterior of each of said floating frames, said shoe being embraced between said downwardly projecting end members and their respective end plates.

17. In combination, a main frame, downwardly projecting end members, detachable end plates fastened thereto at either end thereof and spaced therefrom, floating arches respectively traveling between said end plates and downwardly projecting end members, cutaway portions in said floating frames, rollers embraced between said downwardly projecting end members and end plates traveling in said cutaway portions in the floating frames, said floating frames extending through an arc of 180° between the centers of axles carried in either end of said floating frames measured on said arches, axles carried by said floating frames in either end thereof, said axles being parallel to one another, a plurality of pulverizing elements carried on each of said axles, whereby the weight of the main frame is equally distributed between said axles at all times, said pulverizing elements being of different sizes in each series.

18. In combination, a main frame, downwardly projecting end members, detachable end plates fastened thereto at either end thereof and spaced therefrom, floating arches respectively traveling between said end plates and downwardly projecting end members, cutaway portions in said floating frames, rollers embraced between said downwardly projecting end members and end plates traveling in said cutaway portions in the floating frames, said floating frames extending through an arc of 180° between the centers of axles carried in either end of said floating frames measured on said arches, axles carried by said floating frames in either end thereof, said axles being parallel to one another, a plurality of pulverizing elements carried on each of said axles, whereby the weight of the main frame is equally distributed between said axles at all times, means for removing said end plates for renewing said rollers, said pulverizing elements being of different sizes in each series, means attached to the main frame for moving the implement, and means for supporting the weight of an operator thereon.

In testimony whereof, I affix my signature.

RICHARD H. GRIFFITH.